April 25, 1967      E. R. LARA      3,315,341
PLIERS-TYPE TOOL FOR REMOVING WINDSHIELD WIPER ASSEMBLIES
Filed April 11, 1966
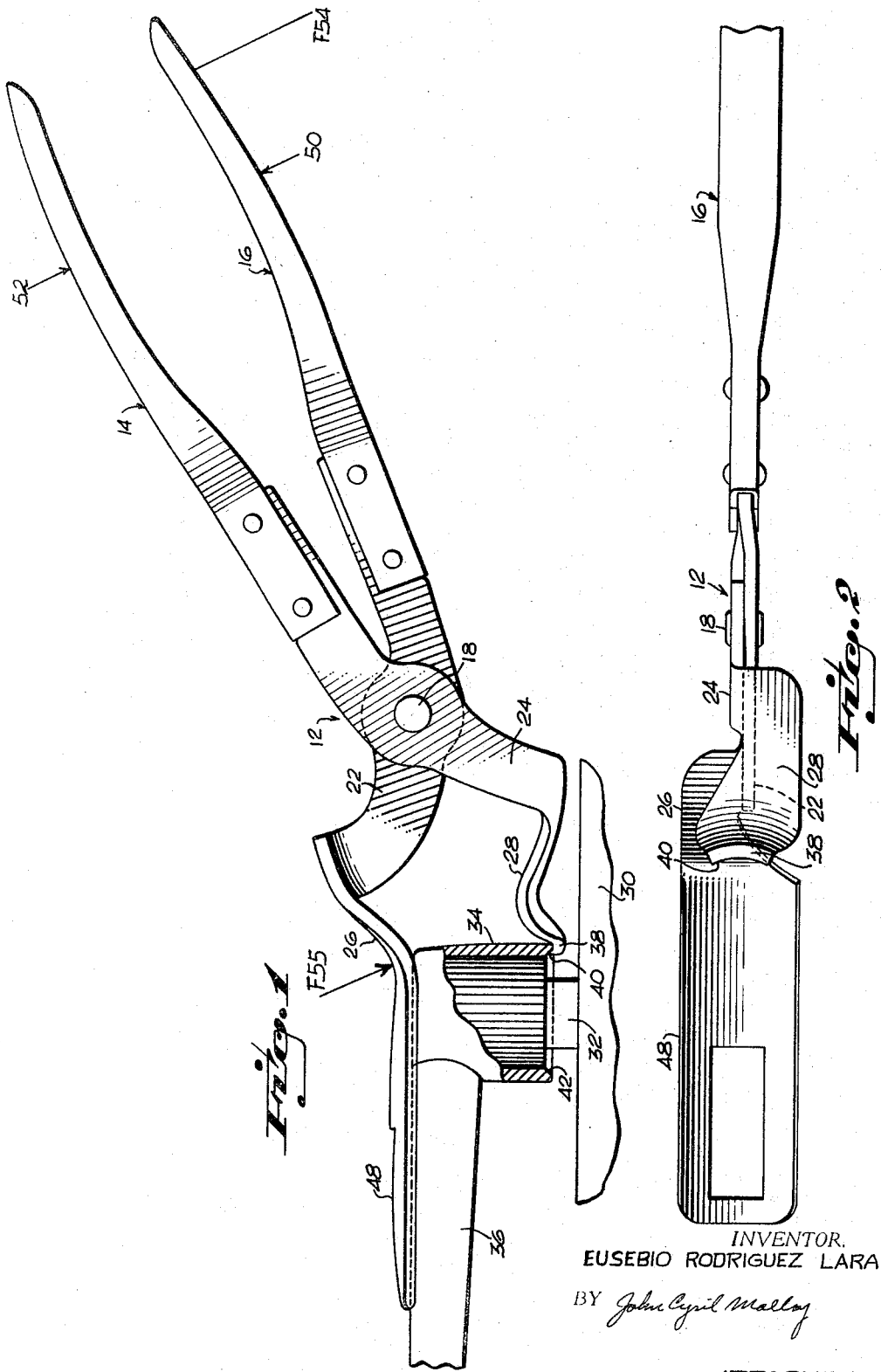
INVENTOR.
EUSEBIO RODRIGUEZ LARA
BY John Cyril Malloy
ATTORNEY.

3,315,341
PLIERS-TYPE TOOL FOR REMOVING WIND-
SHIELD WIPER ASSEMBLIES
Eusebio Rodriguez Lara, 303 NW. 50th Ave.,
Miami, Fla. 33126
Filed Apr. 11, 1966, Ser. No. 541,648
4 Claims. (Cl. 29—278)

This invention relates to a tool and, more particularly, to a tool for removing windshield wiper assemblies from their mounting adjacently forward of the windshields of automobiles.

As is perhaps well known, windshield wiper blades are readily removable from the windshield wiper assemblies on the front of automobiles; however, it is quite often required to remove the mounting for the blades or the entire assembly. The entire assembly is mounted to a rotatable stud by means of a cup-shaped portion which snugly fits over the stud. The present invention provides for a tool for assistance in removing the mounting.

It is, accordingly, an object of this invention to provide a tool for removing windshield wiper assemblies from the mounting on automobiles or other vehicles.

It is another object of this invention to provide a tool including a pair of pivotal jaws with one jaw having a shortened lip adapted to engage the rim of the cup-shaped portion of a windshield wiper blade mount on one side of the center line of the rotatable stud to which it is mounted and an extended lip to overlay the wiper blade mounting extending on the other side of the center line of the stud so that the jaws may be closed and by working the tool in a generally upward direction parallel to the center line of the stud the entire mounting may be readily removed.

It is a general object of this invention to provide a tool of the type described which is simple in construction, inexpensive to manufacture, and is adapted for the purpose of removing windshield wiper blade assemblies from vehicles.

In accordance with these and other objects which will become apparent hereinafter, the instant invention will now by described with reference to the accompanying drawings illustrating a preferred embodiment thereof.

In the drawings:

FIG. 1 is a side elevation view of the instant invention illustrated in relation to a fragmentary partly-broken away view of a windshield wiper blade mounting; and FIG. 2 is a bottom plan view of the device of FIG. 1.

Referring more particularly to the drawings, wherein like reference characters designate like or corresponding parts throughout the different views, and referring particularly to FIGURE 1, the numeral 12 generally designates the tool and it is seen to include a first and a second leg 14 and 16 which extend in a generally common direction in a common plane and which are pivotally connected as at 18 with each leg having an arm 22 and 24 extending on the other side of the pivot point, each of said arms curving arcuately outwardly of the pivot point. Note in FIG. 2 that the offset of legs 14 and 16 rearwardly of the pivotal connection 18 constitutes a stop means limiting the opening movement of arms 22 and 24. To the distal end of each arm a jaw is provided, an elongated upper jaw 26 and a shortened lower jaw 28, the purpose of which will best be understood on reference to FIG. 1 where it is shown that the numeral 30 designates the front panel of an automobile just forward of a windshield at which point there is customarily mounted a rotatable member 32 for receiving a cup-shaped mount member 34 of a windshield wiper blade assembly 36 so that on rotation of the member 32 the blade assembly by reason of its snug fit with the member 34, is caused to rotate so that a rubber wiper blade, not shown, alternately sweeps across the windshield to wipe it clean.

Turning now to the tool, the distal end of the lower jaw 28 is provided with a lip 38 which, as is seen in bottom plan, is arcuate and includes a relatively sharp brink edge 40 for the purpose of fitting under the rim 42 of the member 34. The upper elongate jaw includes a relatively long lip portion 48 extending beyond the diametrically opposite point of engagement of the lower lip on the member 34 as seen in plan so that by applying opposite pressure as indicated by the arrows 50 and 52 on the handle, the wiper blade mounting assembly is gripped and nestled on the top and by reason of the distal lip 48 of the elongate jaw 26 tends to be gripped not only by the lower jaw on one side of the member 34 but also on the other side of the member 34 by reason of the transmission of forces thereto by reason of tilting of the entire tool by rotating both of the legs 14 and 16 in the direction of the large arow F54 so that by rocking the tool back and forth with the backward rotation applying a force F55 the wiper blade assembly may be removed with the lip 38 acting as a lift to raise it off of its mounting.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. A tool for removing an inverted cup-shaped member having a radially projecting arm outwardly of and in the plane of the floor, which cup-shaped member is snugly mounted on a cylindrical member nestled in the recess of the cup-shaped member comprising; pivot means and a first and a second member connected intermediate their lengths and extending in a substantially common plane on either side of the pivot means and arranged for pivotal movement with respect to the said pivot means, each of said members having an extended leg portion and an arm portion with the said pivot means being therebetween, said leg portions being for a purpose of manipulating the arms and said arms extending apart from one another to define a mouth therebetween, one of said arms having a jaw on the distal end thereof with a terminal lip of arcuate shape to companionately engage the brim of a cup-shaped member and the other of said jaws being of sufficient length to extend beyond a cup-shaped member, said jaws being sized so that on movement of the leg portions into close adjacent relation, the jaws are closed and by manipulating said tool with leg portions in close adjacent relation, the cup-shaped member may be lifted from the stud on which it is mounted.

2. A tool as set forth in claim 1 wherein said other jaw is provided with a through recess therein.

3. A tool as set forth in claim 1 wherein stop means are provided to limit the pivotal movement of the legs.

4. A tool as set forth in claim 1 wherein the said arms in a generally longitudinal direction are arcuately curved outwardly defining the said mouth thence said jaws arcuately curve inwardly towards one another and finally outwardly to the terminal ends to facilitate grasping of a cup-shaped member.

References Cited by the Examiner

UNITED STATES PATENTS

| | | | |
|---|---|---|---|
| 3,046,646 | 7/1962 | Buck | 29—278 |
| 3,071,849 | 1/1963 | Krohm. | |
| 3,232,657 | 2/1966 | Thompson et al. | 294—118 X |

WILLIAM FELDMAN, *Primary Examiner.*

M. S. MEHR, *Examiner.*